United States Patent
Nakamura et al.

(10) Patent No.: US 9,754,603 B2
(45) Date of Patent: Sep. 5, 2017

(54) SPEECH FEATURE EXTRACTION APPARATUS AND SPEECH FEATURE EXTRACTION METHOD

(71) Applicants: Masanobu Nakamura, Tokyo (JP); Takashi Masuko, Kawasaki (JP)

(72) Inventors: Masanobu Nakamura, Tokyo (JP); Takashi Masuko, Kawasaki (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 452 days.

(21) Appl. No.: 13/728,287

(22) Filed: Dec. 27, 2012

(65) Prior Publication Data

US 2013/0179158 A1    Jul. 11, 2013

(30) Foreign Application Priority Data

Jan. 10, 2012  (JP) ................................. 2012-002133
Mar. 9, 2012  (JP) ................................. 2012-053506

(51) Int. Cl.
  *G10L 21/00*   (2013.01)
  *G10L 15/02*   (2006.01)
  *G10L 15/20*   (2006.01)

(52) U.S. Cl.
  CPC .............. *G10L 21/00* (2013.01); *G10L 15/02* (2013.01); *G10L 15/20* (2013.01)

(58) Field of Classification Search
  CPC ......... G10L 15/00; G10L 15/02; G10L 15/20; G10L 21/00
  See application file for complete search history.

(56) References Cited

U.S. PATENT DOCUMENTS

| 4,592,085 A * | 5/1986 | Watari .................... G10L 15/00 704/238 |
| 4,852,175 A * | 7/1989 | Kates ................... H03G 3/3089 381/317 |
| 2010/0286981 A1* | 11/2010 | Krini et al. .................... 704/206 |

FOREIGN PATENT DOCUMENTS

| JP | 2000-66691 A | 3/2000 |
| JP | 2001-249674 A | 9/2001 |
| JP | 2006-145694 A | 6/2006 |

(Continued)

OTHER PUBLICATIONS

Zhu, et al.; Product of Power Spectrum and Group Delay Function for Speech Recognition; Proc. ICASSP 2004, Canada, ISCA, May 17, 2014, vol. 1, pp. 125-128.*

(Continued)

*Primary Examiner* — Angela A Armstrong
(74) *Attorney, Agent, or Firm* — Ohlandt, Greeley, Ruggiero & Perle, L.L.P.

(57) ABSTRACT

According to one embodiment, a speech feature extraction apparatus includes an extraction unit and a calculation unit. The extraction unit extracts speech segments over a predetermined period at intervals of a unit time from either an input speech signal or a plurality of subband input speech signals obtained by extracting signal components of a plurality of frequency bands from the input speech signal, to generate either a unit speech signal or a plurality of subband unit speech signals. The calculation unit calculates either each average time of the unit speech signal in each of the plurality of frequency bands or each average time of each of the plurality of subband unit speech signals to obtain a speech feature.

16 Claims, 13 Drawing Sheets

(56) References Cited

FOREIGN PATENT DOCUMENTS

JP          2010-85933 A     4/2010

OTHER PUBLICATIONS

Van Son et al , "Acoustic Consonant Reduction: A Comparison," Institute of Phonetic Sciences, University of Amsterdam, Proceedings 19 (1995), 83-91.*
In proceedings of 2011 Autumn Meeting Acoustic Society of Japan, pp. 95-98, "Speech recognition using long term phase information with amplitude spectral information"; K. Yamamoto et al.; 2011. Referenced in the specification filed concurrently herewith, see p. 21, line 20.
Time Frequency Analysis, Chap. 1, Sec. 2, "The Time Description of Signals"; L. Cohen; 1998, consisting of 4 pages. Referenced in the specification filed concurrently herewith, see p. 9, line 24.
Technical Paper of IEICE, vol. 110, No. 143, pp. 31-36, "Speech Recognition using Phase Information based on Long-Term Analysis"; K. Yamamoto et al.; 2010 with English abstract. Referenced in the specification filed concurrently herewith, see p. 16, line 19.
Japanese First Office Action dated Dec. 16, 2014 from JP Application No. 2012-053506, 8 pages.
Japanese Decision of Rejection dated Aug. 4, 2015 from corresponding Japanese Patent Application No. 2012-053506, 5 pages.
Sueyoshi et al.; "Examination of the sound recognition by the for a long time phase characteristic parameter"; Acoustical Society of Japan, Mar. 8, 2010, pp. 9-10.

* cited by examiner

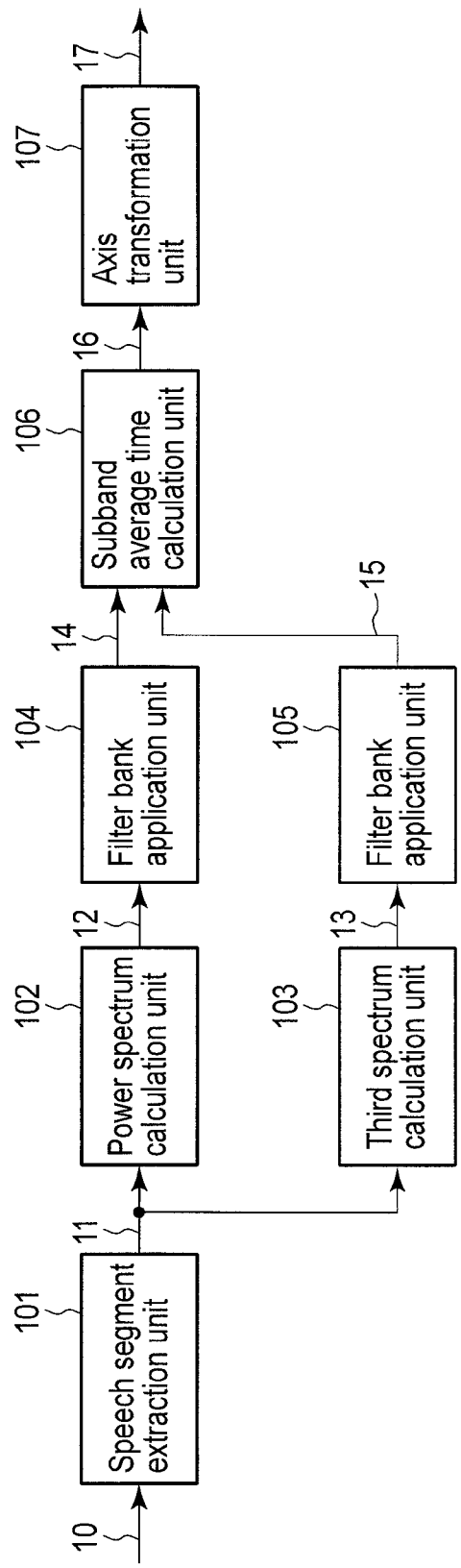
F I G. 1

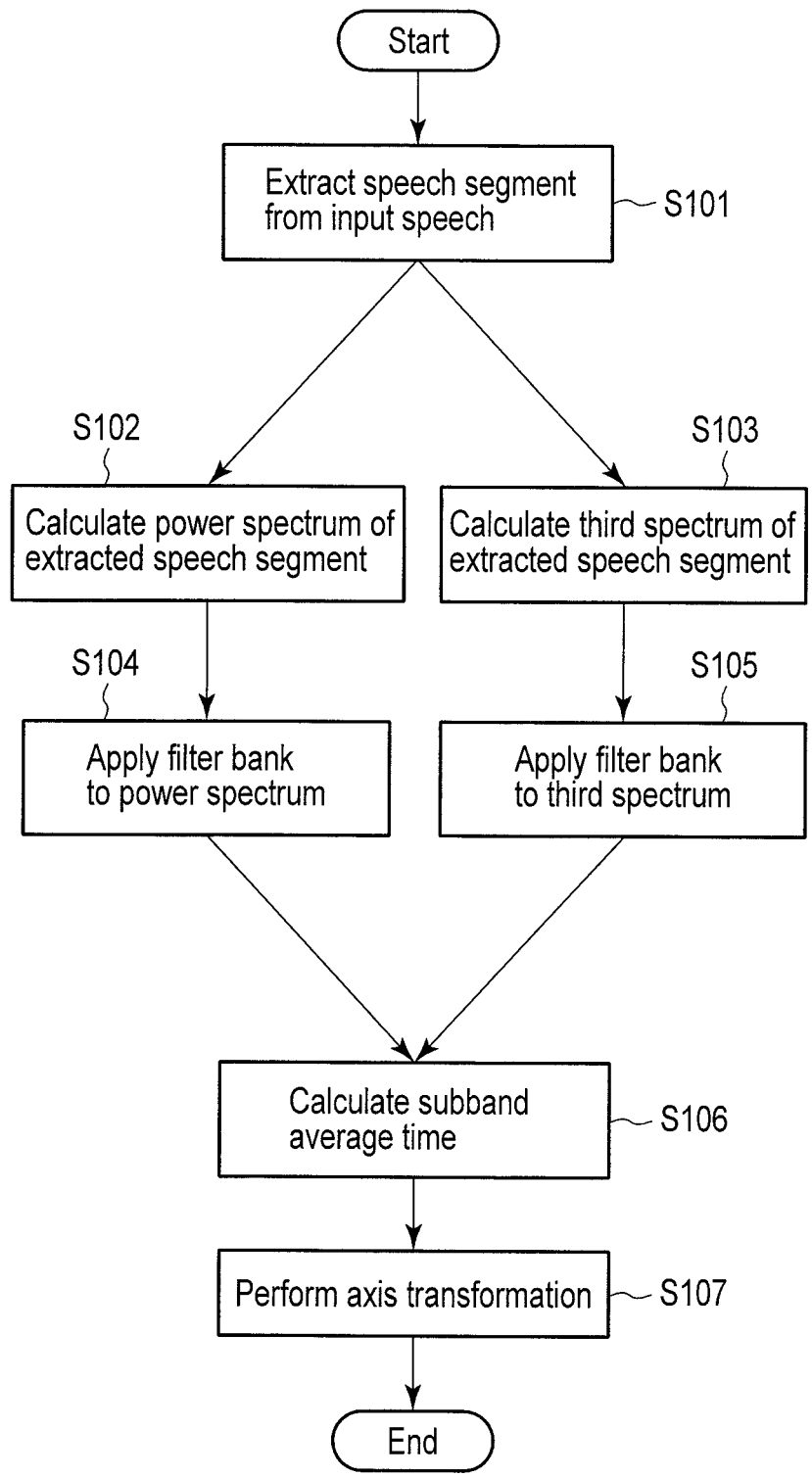
F I G. 2

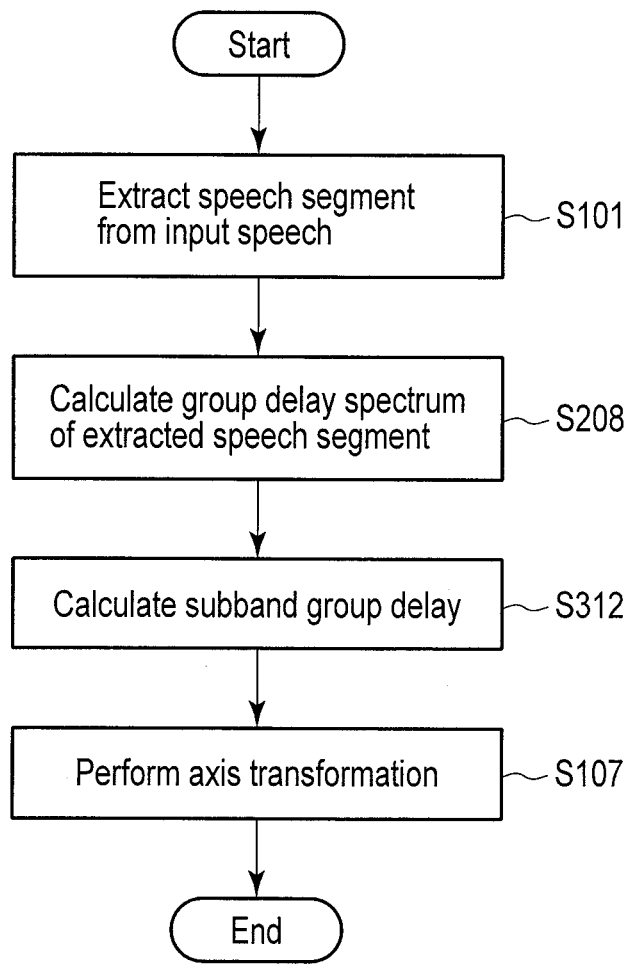
F I G. 5

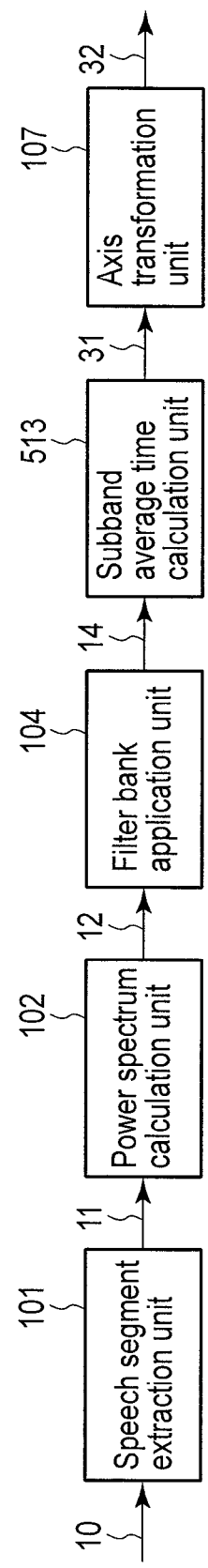
F I G. 8

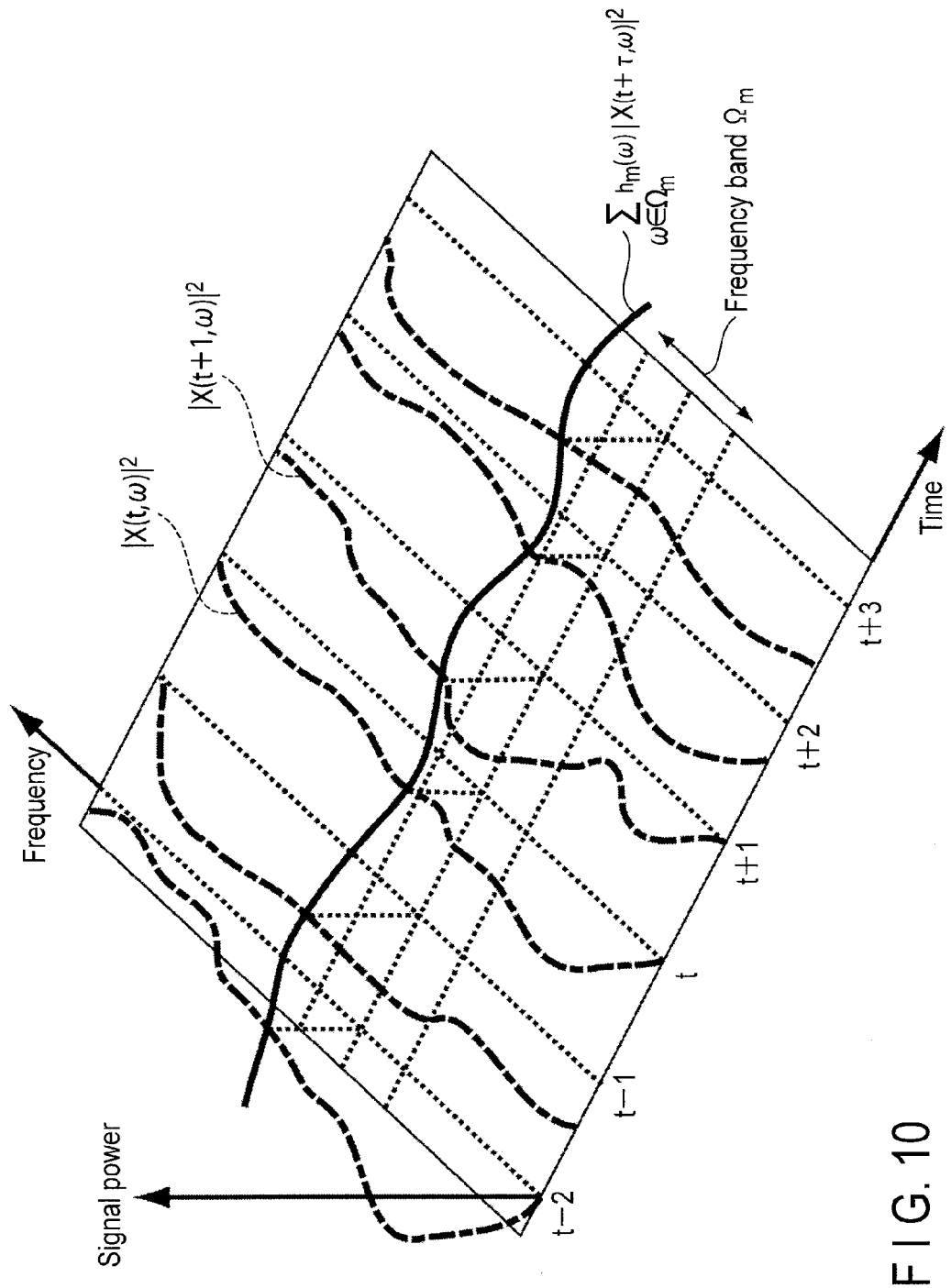
F I G. 10

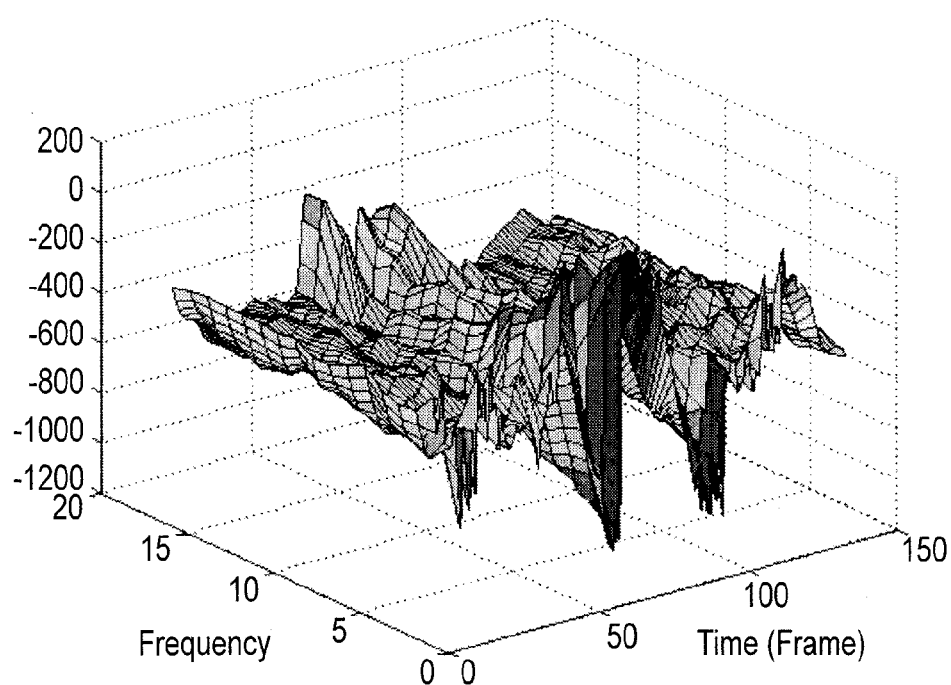
F I G. 15A
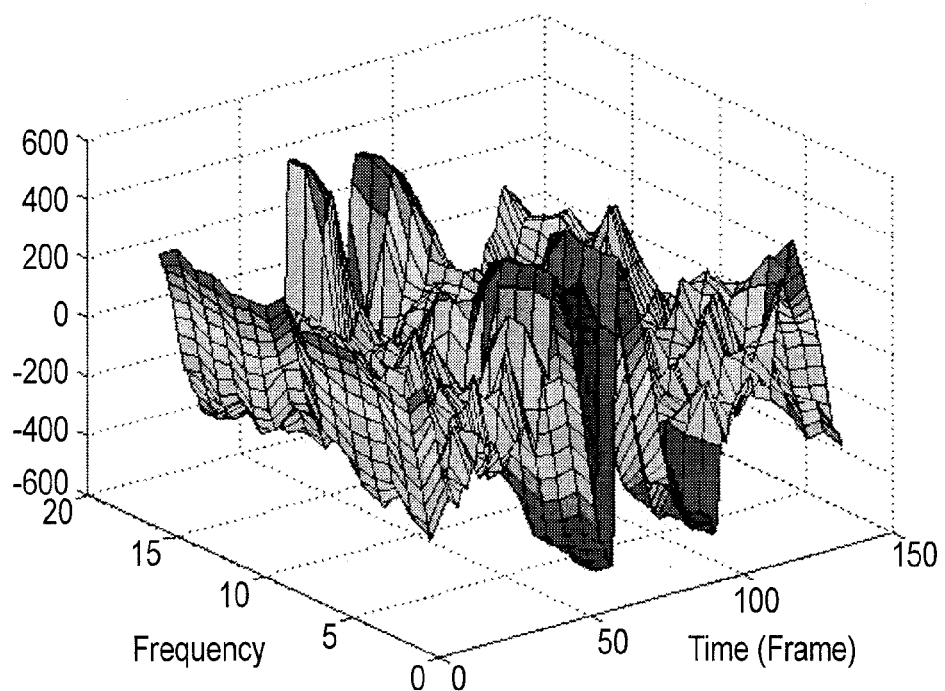
F I G. 15B

SPEECH FEATURE EXTRACTION APPARATUS AND SPEECH FEATURE EXTRACTION METHOD

CROSS-REFERENCE TO RELATED APPLICATIONS

This application is based upon and claims the benefit of priority from Japanese Patent Applications No. 2012-002133, filed Jan. 10, 2012; and No. 2012-053506, filed Mar. 9, 2012, the entire contents of all of which are incorporated herein by reference.

FIELD

Embodiments described herein relate generally to a technique for extracting a speech feature.

BACKGROUND

Speech recognition techniques that can be put to practical use in noisy environments have been more and more important. In a noisy environment, the accuracy of speech recognition is disadvantageously reduced by noise. Speech recognition is performed using a speech feature extracted from an input speech signal. A mel-frequency cepstrum coefficient (MFCC) is known as a type of speech feature. However, speech recognition using only the MFCC does not achieve sufficient noise tolerance. Hence, there has been a demand for a speech feature that enables the noise tolerance of the speech recognition to be improved.

BRIEF DESCRIPTION OF THE DRAWINGS

FIG. 1 is a block diagram illustrating a speech feature extraction apparatus according to a first embodiment;
FIG. 2 is a flowchart illustrating operation of the speech feature extraction apparatus in FIG. 1;
FIG. 5 is a flowchart illustrating operation of a speech feature extraction apparatus according to a comparative example of the second embodiment;
FIG. 8 is a block diagram illustrating a speech feature extraction apparatus according to a fourth embodiment;
FIG. 10 is a diagram illustrating a subband average time calculated according to a fourth embodiment;
FIG. 15A is a diagram illustrating the subband average time calculated according to the first embodiment;
and
FIG. 15B is a diagram illustrating the subband average time calculated according to the fourth embodiment.

DETAILED DESCRIPTION

Figure 3:
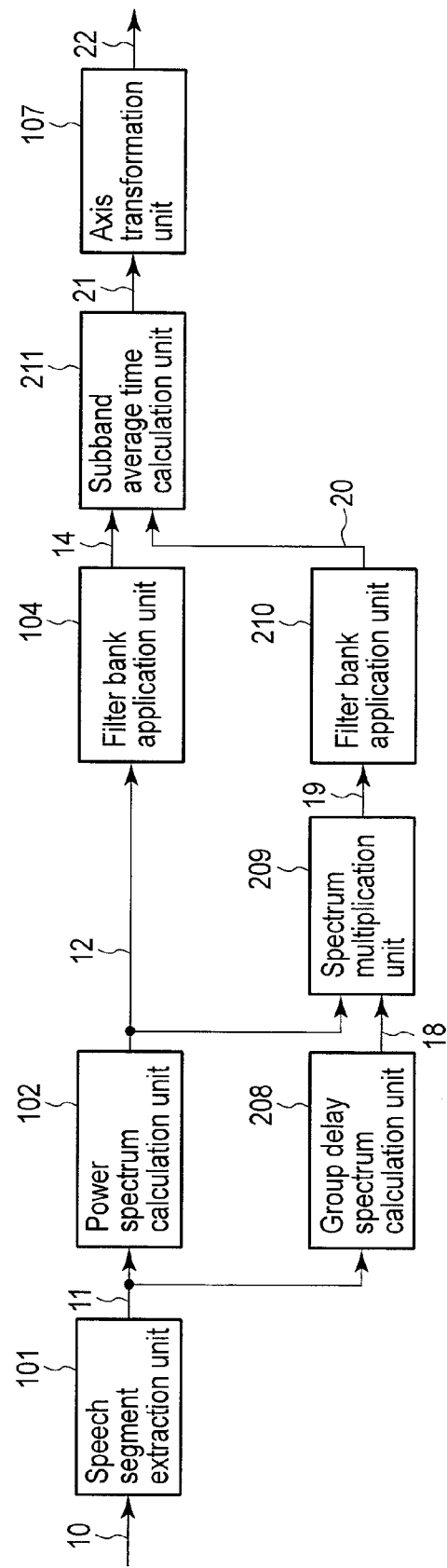
FIG. 3 is a block diagram illustrating a speech feature extraction apparatus according to a second embodiment.

Embodiments will be described below with reference to the drawings.

In general, according to one embodiment, a speech feature extraction apparatus includes an extraction unit and a first calculation unit. The extraction unit extracts speech segments over a predetermined period at intervals of a unit time from either an input speech signal or a plurality of subband input speech signals obtained by extracting signal components of a plurality of frequency bands from the input speech signal, to generate either a unit speech signal or a plurality of subband unit speech signals. The first calculation unit calculates either each average time of the unit speech signal in each of the plurality of frequency bands or each average time of each of the plurality of subband unit speech signals to obtain a speech feature.

Components that are the same as or similar to described components are denoted by the same or similar reference numerals, and duplicate descriptions are basically omitted.

(First Embodiment)

As illustrated in FIG. 1, a speech feature extraction apparatus according to a first embodiment comprises a speech segment extraction unit 101, a power spectrum calculation unit 102, a third spectrum calculation unit 103, filter bank application units 104 and 105, a subband average time calculation unit 106, and an axis transformation unit 107. The speech feature extraction apparatus in FIG. 1 extracts a speech feature 17 from an input speech signal 10.

The speech segment extraction unit 101 obtains the input speech signal 10 from an outside of the speech feature extraction apparatus. The speech segment extraction unit 101 extracts speech segments over a period T (for example, T=56 ms) from the input speech signal 10 at intervals of a unit time to generate a unit speech signal 11 at a time (n) ($x_n(t)$). The period T may be hereinafter referred to as the analysis window width. The speech segment extraction unit 101 may generate a unit speech signal 11 by performing, in addition to the process of extracting speech segments over the period T, a process of removing a direct current component from the extracted speech segments, a process of emphasizing a high-frequency component of the extracted speech segments, a process of multiplying the extracted speech segments by a window function (for example, a Hamming window), and the like. The speech segment extraction unit 101 outputs the unit speech signal 11 to the power spectrum calculation unit 102 and the third spectrum calculation unit 103.

The power spectrum calculation unit 102 inputs the unit speech signal 11 from the speech segment extraction unit 101. The power spectrum calculation unit 102 calculates a power spectrum 12 of the unit speech signal 11. Specifically, complex Fourier transformation may be applied to the unit speech signal 11 to derive a first spectrum for each frequency ($\omega$) ($X(\omega)$) as shown in:

$$X(\omega) = X_R(\omega) + jX_I(\omega) \quad (1)$$

where $X_R(\omega)$ denotes a real part of the first spectrum ($X(\omega)$), $X_I(\omega)$ denotes an imaginary part of the first spectrum ($X(\omega)$), and j denotes an imaginary unit. Moreover, the power spectrum calculation unit 102 calculates the power of the first spectrum to obtain a power spectrum 12 as shown in:

$$|X(\omega)|^2 = X_R^2(\omega) + X_I^2(\omega) \tag{2}$$

The power spectrum calculation unit 102 outputs the power spectrum 12 to a filter bank application unit 104.

The spectrum calculation unit 103 inputs the unit speech signal 11 from the speech segment extraction unit 101. The third spectrum calculation unit 103 calculates a third spectrum 13 utilizing the first spectrum ($X(\omega)$) and a second spectrum that corresponds to a spectrum of the product of the unit speech signal 11 ($x_n(t)$) and the time (t). For example, complex Fourier transformation may be applied to the product of the unit speech signal 11 ($x_n(t)$) and the time (t) to derive a second spectrum for each frequency ($\omega$) as shown in:

$$Y(\omega) = Y_R(\omega) + jY_I(\omega) \tag{3}$$

where $Y_R(\omega)$ denotes a real part of the second spectrum ($Y(\omega)$), and $Y_I(\omega)$ denotes an imaginary part of the second spectrum ($Y(\omega)$). The third spectrum calculation unit 103 calculates the first product of the real part ($X_R(\omega)$) of the first spectrum and the real part ($Y_R(\omega)$) of the second spectrum, calculates the second product of the imaginary part ($X_I(\omega)$) of the first spectrum and the imaginary part ($Y_I(\omega)$) of the second spectrum, and adds the first product and the second product together to obtain a third spectrum 13. That is, the third spectrum calculation unit 103 calculates the third spectrum 13 for each frequency ($\omega$) ($XY(\omega)$) as shown in:

$$XY(\omega) = X_R(\omega)Y_R(\omega) + X_I(\omega)Y_I(\omega) \tag{4}$$

The third spectrum calculation unit 103 outputs the third spectrum 13 to the filter bank application unit 105.

The filter bank application unit 104 inputs the power spectrum 12 from the power spectrum calculation unit 102. The filter bank application unit 104 applies a filter bank to the power spectrum 12 to obtain a filtered power spectrum 14. The filter bank application unit 104 outputs the filtered power spectrum 14 to the subband average time calculation unit 106. The filter bank applied by the filter bank application unit 104 comprises one or more (for example, 16) frequency filters. Each of the frequency filters may be a triangular filter, a rectangular filter, or the like. Furthermore, the filter bank may be a mel filter bank, linear filter bank, or the like.

The filter bank application unit 105 inputs the third spectrum 13 from the third spectrum calculation unit 103. The filter bank application unit 105 applies a filter bank to the third spectrum 13 to obtain a filtered third spectrum 15. The filter bank application unit 105 outputs the filtered third spectrum 15 to the subband average time calculation unit 106. The filter bank applied by the filter bank application unit 105 needs to comprise the same number of frequency filters as that of the filters in the filter bank applied by the filter bank application unit 104. Preferably, the filter bank application unit 105 applies the same filter bank as that applied by the filter bank application unit 104. The following description assumes that the filter bank application unit 105 applies the same filter bank as that applied by the filter bank application unit 104.

The subband average time, calculation unit 106 inputs the filtered power spectrum 14 from the filter bank application unit 104 and inputs the third spectrum 15 from the filter bank application unit 105. On the basis of the filtered power spectrum 14 and the filtered third spectrum 15, the subband average time calculation unit 106 calculates the average time of the unit speech signal 11 in each of at least one frequency band (also referred to as a subband) (the average time is hereinafter also referred to as the subband average time 16). The subband average time calculation unit 106 outputs the subband average time 16 to the axis transformation unit 107. The process performed by the subband average time calculation unit 106 will be described in detail.

The axis transformation unit 107 inputs the subband average time 16 from the subband average time calculation unit 106. The axis transformation unit 107 applies an axis transformation process on the subband average time 16 to generate a speech feature 17. The speech feature 17 is hereinafter also referred to as the subband average time cepstrum (SATC). The axis transformation unit 107 may use discrete cosine transformation (DCT). The axis transformation unit 107 outputs the speech feature to an outside of the speech feature extraction apparatus. The axis transformation unit 107 may be omitted. In this case, the subband average time 16 is output to the outside of the speech feature extraction apparatus as the speech feature 17. For example, if the total number of the frequency filters in each of the filter banks applied by the filter bank application units 104 and 105 is 1, the axis transformation unit 107 is unnecessary.

Here, the subband average time 16 means time required to reach the center of energy gravity of the unit speech signal 11 in each of the at least one frequency band. For the average time for general signals, L. Cohen, "Time-Frequency Analysis" (Asakura Publishing Co., Ltd.), Oct. 1, 1998, pp. 4-5 discloses the definition shown in:

$$\begin{aligned}\langle t \rangle &= \int t|s(t)|^2 dt \\ &= \int \tau_g(\omega)|S(\omega)|^2 d\omega \\ &= \frac{\int \tau_g(\omega)|X(\omega)|^2 d\omega}{\int |X(\omega)|^2 d\omega}\end{aligned} \tag{5}$$

where s(t) denotes a power normalized signal obtained by normalizing the power of a signal in an analysis window; $S(\omega)$ denotes a spectrum for each frequency ($\omega$) obtained by applying complex Fourier transformation on the power normalized signal (s(t)); and $\tau_g(\omega)$ denotes a group delay spectrum for each frequency ($\omega$). Expression (5) defines the average time of the signal over all the frequency bands. Specifically, in Expression (5), the numerator on the right side represents the summation of the group delay spectrum and the power spectrum over all the frequency bands. The denominator on the right side represents the summation of the power spectrum over all the frequency bands. On the other hand, the subband average time 16 means the average time of the unit speech signal 11 in each of the et least one frequency band as described above. The average time ($\langle t \rangle_{(m)}$) of the unit speech signal 11 in the $m^{th}$ frequency band ($\Omega_m$) can be calculated, for example, in accordance with Expression (6) described below. Here, m denotes an index used to identify each of the at least one frequency band and which is an integer of at least 1 and at most M; and M denotes the total number of the frequency bands which is smaller than the bin number of the frequency ($\omega$).

$$\langle t \rangle_{(m)} = \frac{\sum_{\omega \in \Omega_m} h_m(\omega)\tau_g(\omega)|X(\omega)|^2}{\sum_{\omega \in \Omega_m} h_m(\omega)|X(\omega)|^2} \quad (6)$$

where, $h_m(\omega)$ denotes one of the frequency filters in the filter banks applied by the filter bank application units 104 and 105 which corresponds to the $m^{th}$ frequency band ($\Omega_m$). The group delay spectrum ($\tau_g(\omega)$) in Expression (6) can be expressed as shown in:

$$\tau_g = \frac{X_R(\omega)Y_R(\omega) + X_I(\omega)Y_I(\omega)}{X_R(\omega)X_R(\omega) + X_I(\omega)X_I(\omega)} \quad (7)$$

According to Expressions (2), (4), and (7), the product of the group delay spectrum and the power spectrum ($\tau_g(\omega)|X(\omega)|^2$) in Expression (6) is equal to the third spectrum ($XY(\omega)$). Hence, on the basis of Expression (7), Expression (6) can be rewritten as:

$$\langle t \rangle_{(m)} = \frac{\sum_{\omega \in \Omega_m} h_m(\omega)XY(\omega)}{\sum_{\omega \in \Omega_m} h_m(\omega)|X(\omega)|^2} \quad (8)$$

where $h_m(\omega)|X(\omega)|^2$ corresponds to the filtered power spectrum 14. $h_m(\omega)XY(\omega)$ corresponds to the filtered third spectrum 15. That is, the subband average time calculation unit 106 obtains the subband average time 16 in the $m^{th}$ frequency band ($\Omega_m$) by dividing the summation of the filtered third spectrum 15 in the $m^{th}$ frequency band ($\Omega_m$) by the summation of the filtered power spectrum 14 in the $m^{th}$ frequency band ($\Omega_m$).

The speech feature extraction apparatus in FIG. 1 can operate as illustrated in FIG. 2. The speech segment extraction unit 101 extracts speech segments over the period T, at intervals of the unit time, from the input speech signal 10 obtained from the outside of the speech feature extraction apparatus to generate a unit speech signal 11 (step S101).

The power spectrum calculation unit 102 calculates the power spectrum 12 of the unit speech signal 11 generated in step S101 (step 102). Specifically, the power spectrum calculation unit 102 calculates the power of the first spectrum ($X(\omega)$) to obtain a power spectrum 12. The filter bank application unit 104 applies the filter bank to the power spectrum 12 calculated in step S102 to obtain a filtered power spectrum 14 (step S104).

The third spectrum calculation unit 103 calculates the power spectrum 12 of the unit speech signal 11 generated in step S101 (step S103). Specifically, the third spectrum calculation unit 103 calculates the first product of the real part ($X_R(\omega)$) of the first spectrum and the real part ($Y_R(\omega)$) of the second spectrum, calculates the second product of the imaginary part ($X_I(\omega)$) of the first spectrum and the imaginary part ($Y_I(\omega)$) of the second spectrum, and adding the first product and the second product together to obtain a third spectrum 13. The filter bank application unit 105 applies the filter bank to the third spectrum 13 to obtain a filtered third spectrum 15 (step S105).

Here, the series of operations in steps S102 and S104 and the series of operations in steps S103 and S105 do not depend on each other, and thus after step S101 is completed, the two series of operations may be performed in parallel or in series.

On the basis of the filtered power spectrum 14 obtained in step S104 and the filtered third spectrum 15 obtained in step S105, the subband average time calculation unit 106 calculates the subband average time 16 (step S106). Specifically, the subband average time calculation unit 106 obtains the subband average time 16 in the $m^{th}$ frequency band ($\Omega_m$) by dividing the summation of the filtered third spectrum 15 in the $m^{th}$ frequency band ($\Omega_m$) by the summation of the filtered power spectrum 14 in the $m^{th}$ frequency band ($\Omega_m$). The axis transformation unit 107 performs an axis transformation process on the subband average time 16 calculated in step S106 to generate a speech feature 17.

As described above, the speech feature extraction apparatus according to the first embodiment extracts an SATC as a speech feature. The speech feature extraction apparatus couples (adds) the SATC to a conventional speech feature such as an MFCC, thus enabling the noise tolerance of speech recognition to be improved.

In the present embodiment, the filter bank application units 104 and 105 may be omitted. In this case, the subband average time calculation unit 106 calculates the subband average time 16 on the basis of the power spectrum 12 and the third spectrum 13. Specifically, the subband average time calculation unit 106 can utilize Expression (9).

$$\langle t \rangle_{(m)} = \frac{\sum_{\omega \in \Omega_m} XY(\omega)}{\sum_{\omega \in \Omega_m} |X(\omega)|^2} \quad (9)$$

where $|X(\omega)|^2$ corresponds to the power spectrum 12, and $XY(\omega)$ corresponds to the third spectrum 13. That is, the subband average time calculation unit 106 obtains the subband average time 16 in the $m^{th}$ frequency band ($\Omega_m$) by dividing the summation of the third spectrum 13 in the $m^{th}$ frequency band ($\Omega_m$) by the summation of the power spectrum 12 in the $m^{th}$ frequency band ($\Omega_m$).

(Second Embodiment)

In the above-described first embodiment, for example, in accordance with Expression (8) described above, the subband average time is calculated on the basis of the power spectrum and the third spectrum. On the other hand, in accordance with Expression (6), the subband average time may be calculated on the basis of the group delay spectrum and the power spectrum.

As illustrated in FIG. 3, a speech feature extraction apparatus according to a second embodiment comprises a speech segment extraction unit 101, a power spectrum calculation unit 102, a filter bank application unit 104, an axis transformation unit 107, a group delay spectrum calculation unit 208, a spectrum multiplication unit 209, a filter bank application unit 210, and a subband average time calculation unit 211. The speech feature extraction apparatus in FIG. 3 extracts a speech feature 22 from an input speech signal 10.

The group delay spectrum calculation unit 208 inputs a unit speech signal 11 from the speech segment extraction unit 101. The group delay spectrum calculation unit 208 calculates a group delay spectrum 18 of the unit speech signal 11. The group delay spectrum calculation unit 208 outputs the group delay spectrum 18 to the spectrum multiplication unit 209.

For example, the group delay spectrum calculation unit 208 may calculate the group delay spectrum 18 by substituting the real part ($X_R(\omega)$) and imaginary part ($X_I(\omega)$) of the first spectrum and the real part ($Y_R(\omega)$) and imaginary part ($Y_I(\omega)$) of the second spectrum into Expression (7) described above.

Alternatively, the group delay spectrum calculation unit 208 may calculate the group delay spectrum 18 using a technique different from that for Expression (7). Specifically, the group delay spectrum 18 ($\tau_g(\omega)$) is defined as a value obtained by differentiating a phase term ($\theta(\omega)$) of a first spectrum ($X(\omega)$) with respect to frequency ($\omega$) and inverting the sign of the resultant value as shown in:

$$\tau_g(\omega) = -\frac{\partial \theta(\omega)}{\partial \omega} \quad (10)$$

Here, the phase term ($\theta(\omega)$) is defined by:

$$\theta(\omega) = \tan^{-1} \frac{X_R(\omega)}{X_I(\omega)} \quad (11)$$

Thus, the group delay spectrum calculation unit 208 may calculate the group delay spectrum 18 using a difference value, in a frequency ($\omega$) axis direction, of the phase term ($\theta(\omega)$) shown in Expression (11) as described in Yamamoto et al., "Speech recognition using phase information based on long-term analysis" (report on speech signal processing techniques SP2010-40). If the present technique is used to calculate the group delay spectrum 18, a phase unwrapping process needs to be performed in order to set the value of the phase term ($\theta(\omega)$) within the range of $-\pi$ to $\pi$.

The spectrum multiplication unit 209 inputs a power spectrum 12 from the power spectrum calculation unit 102, and inputs the group delay spectrum 18 from the group delay spectrum calculation unit 208. The spectrum multiplication unit 209 multiplies the power spectrum 12 by the group delay spectrum 18 to obtain a multiplication spectrum 19. The spectrum multiplication unit 209 outputs the multiplication spectrum 19 to the filter bank application unit 210. The multiplication spectrum 19 corresponds to the third spectrum 13.

The filter bank application unit 210 inputs the multiplication spectrum 19 from the multiplication spectrum calculation unit 209. The filter bank application unit 210 applies the filter bank to the multiplication spectrum 19 to obtain a filtered multiplication spectrum 20. The filter bank application unit 210 outputs the filtered multiplication spectrum 20 to the subband average time calculation unit 211. The filter bank applied by the filter bank application unit 210 needs to comprise the same number of frequency filters as that of the filters in the filter bank applied by the filter bank application unit 104. Preferably, the filter bank application unit 210 applies the same filter bank as that applied by the filter bank application unit 104. The following description assumes that the filter bank application unit 210 applies the same filter bank as that applied by the filter bank application unit 104.

The subband average time calculation unit 211 inputs a filtered power spectrum 14 from the filter bank application unit 104 and inputs the filtered multiplication spectrum 20 from the filter bank application unit 210. On the basis of the filtered power spectrum 14 and the filtered multiplication spectrum 20, the subband average time calculation unit 211 calculates the average time of the unit speech signal 11 in each of at least one frequency band (the average time is hereinafter also referred to as the subband average time 21).

Specifically, the subband average time calculation unit 211 can utilize Expression (6) described above. In Expression (6), $h_m(\omega)\tau_g(\omega)|X(\omega)|^2$ corresponds to the filtered multiplication spectrum 20; and $h_m(\omega)|X(\omega)|^2$ corresponds to the filtered power spectrum 14. That is, the subband average time calculation unit 211 obtains the subband average time 21 in the $m^{th}$ frequency band ($\Omega_m$) by dividing the summation of the filtered multiplication spectrum 20 in the $m^{th}$ frequency band ($\Omega_m$) by the summation of the filtered power spectrum 14 in the $m^{th}$ frequency band ($\Omega_m$). The subband average time calculation unit 211 outputs the subband average time 21 to the axis transformation unit 107.

The axis transformation unit 107 inputs the subband average time 21 from the subband average time calculation unit 211. The axis transformation unit 107 performs an axis transformation process that is the same as or similar to the axis transformation process according to the first embodiment to generate a speech feature 22. The speech feature 22 corresponds to the above-described speech feature 17 and is also referred to as the SATC. The axis transformation unit 107 outputs the speech feature 22 to an outside of the speech feature extraction apparatus. The axis transformation unit 107 may be omitted. In this case, the subband average time 21 is output to the outside of the speech feature extraction apparatus as the speech feature 22. For example, if the total number of the frequency filters in each of the filter banks applied by the filter bank application units 104 and 210 is 1, the axis transformation unit 107 is unnecessary.

Figure 4:
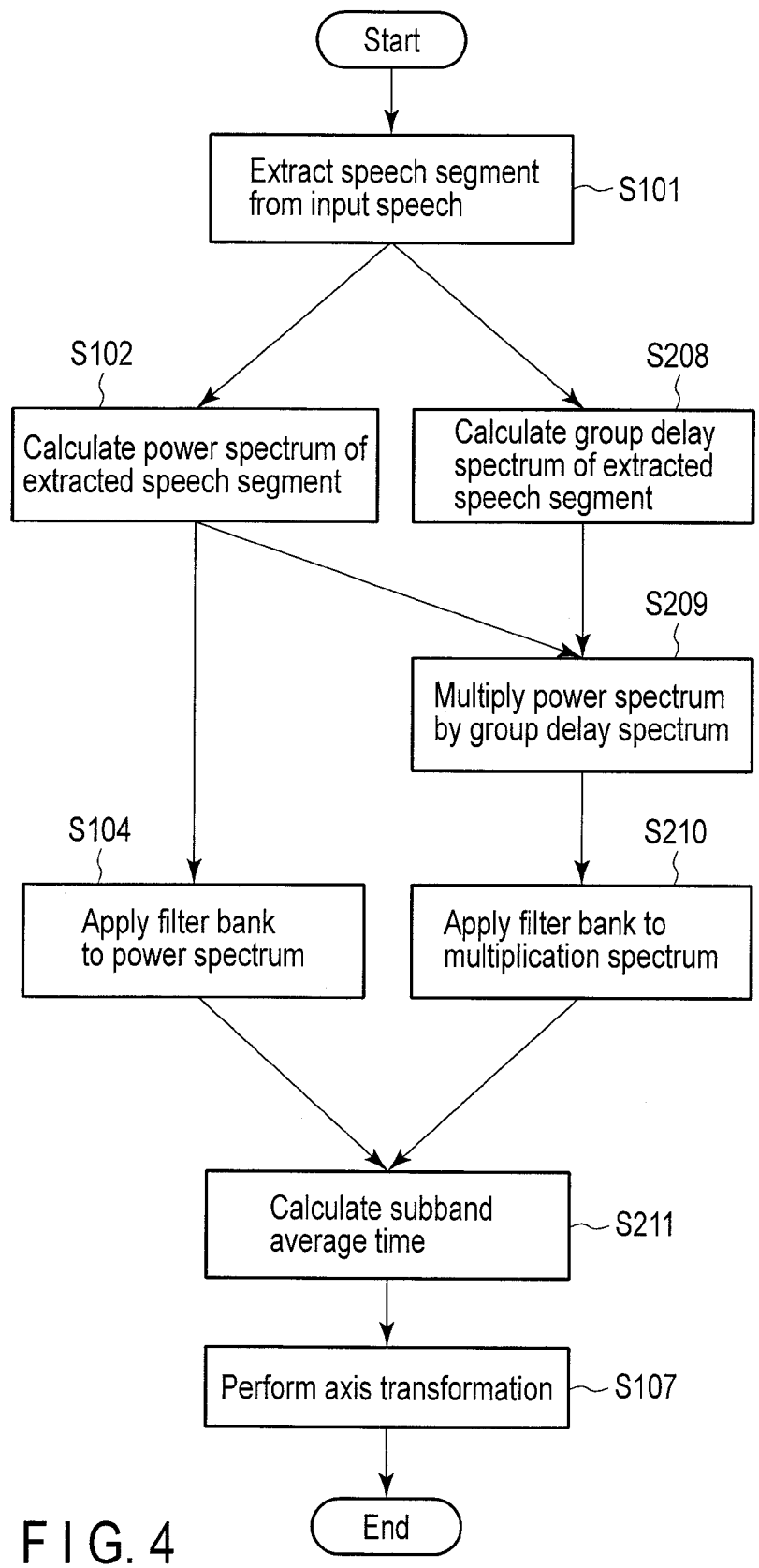
FIG. 4 is a flowchart illustrating operation of the speech feature extraction apparatus in FIG. 3.

The speech feature extraction apparatus in FIG. 3 can operate as illustrated in FIG. 4. The group delay spectrum calculation unit 208 calculates a group delay spectrum 18 of the unit speech signal 11 generated in step S101 (step S208). Specifically, the group delay spectrum calculation unit 208 may calculate the group delay spectrum 18 using Expression (7) described above or a difference value, in the frequency ($\omega$) axis direction, of the phase term ($\theta(\omega)$) shown in Expression (11).

Here, the operation in step S102 and the operation in step S208 do not depend on each other, and thus after step S101 is completed, these operations may be performed in parallel or in series.

The spectrum multiplication unit 209 multiplies the power spectrum 12 calculated in step S102 by the group delay spectrum 18 calculated in step S208 to obtain a multiplication spectrum 19 (step S209). The filter bank application unit 210 applies the filter bank to the multiplication spectrum 19 calculated in step S209 to obtain a filtered multiplication spectrum 20 (step S210).

Here, the series of operations in steps S209 and S210 and the operation in step S104 do not depend on each other, and thus after step S102 is completed, both of these operations may be performed in parallel or in series. However, the operation in step S209 needs to be performed after not only step S102 but also step S208 is completed.

On the basis of the filtered power spectrum 14 obtained in step S104 and the filtered multiplication spectrum 20 obtained in step S210, the subband average time calculation unit 211 calculates the subband average time 21 (step S211). Specifically, the subband average time calculation unit 211 obtains the subband average time 21 in the $m^{th}$ frequency band ($\Omega_m$) by dividing the summation of the filtered multiplication spectrum 20 in the $m^{th}$ frequency band ($\Omega_m$) by the summation of the filtered power spectrum 14 in the $m^{th}$ frequency band ($\Omega_m$). The axis transformation unit 107 performs an axis transformation process on the subband average time 21 calculated in step S211 to generate a speech feature 22.

As described above, the speech feature extraction apparatus according to the second embodiment extracts the SATC as a speech feature. Thus, the speech feature extraction apparatus can exert effects that are the same as or similar to the effects of the first embodiment.

The effects of the present embodiment will be described through a comparison of the present embodiment with two comparative examples. In the description below, Comparative Example 1 corresponds to the conventional speech recognition using only the MFCC. Comparative Example 2 corresponds to speech recognition using a speech feature obtained by coupling, to the MFCC, a long-term group delay cepstrum disclosed in Yamamoto et al., "Speech recognition using longterm phase information with amplitude spectral information" (a collection of papers for autumn 2011, 2-Q-13, from the Acoustical Society of Japan). Specifically, the long-term group delay cepstrum in Comparative Example 2 is extracted by a speech feature extraction apparatus operating as illustrated in FIG. 5.

The speech feature extraction apparatus according to Comparative Example 2 generates a unit speech signal by extracting speech segments from an input speech signal at intervals of a unit time (step S101). The speech feature extraction apparatus calculates a group delay spectrum of the unit speech signal generated in step S101 (step S208). The speech feature extraction apparatus calculates a subband group delay spectrum on the basis of the group delay spectrum calculated in step S208 (step S312). The speech feature extraction apparatus performs an axis transformation process on the subband group delay spectrum calculated in step S312 to generate a long-term group delay cepstrum (step S107).

Figure 6:
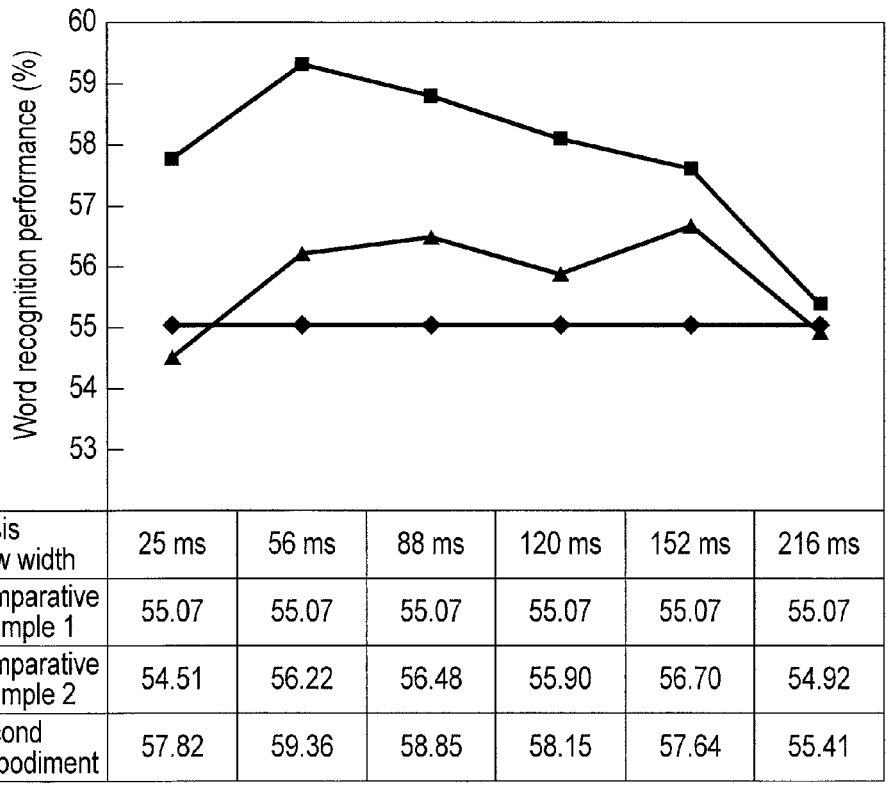
FIG. 6 is a diagram illustrating effects of the second embodiment.

FIG. 6 shows the results of speech recognition using a speech feature obtained by coupling, to the MFCC, the SATC extracted by the speech feature extraction apparatus according to the present embodiment, the results of speech recognition according to Comparative Example 1, and the results of speech recognition according to Comparative Example 2. Specifically, FIG. 6 shows word recognition performance (%) evaluated when about 100,000 words were subjected to isolated word recognition in a noisy environment such as a station yard using the three types of features. The present evaluation experiments evaluated the word recognition performance according to five levels of a signal-to-noise ratio (SNR) of 20, 15, 10, 5, and 0 dB in order to check the word recognition performance in the noisy environment. FIG. 6 shows the average values of the word recognition performance evaluated according to the five levels of the SNR. Furthermore, the present evaluation experiments evaluated the word recognition performance for the long-term group delay cepstrum and the SATC according to a plurality of levels of an analysis window width (ms).

Comparative Example 1 uses only an MFCC extracted with the analysis window width fixed to 25 ms and thus achieves a certain level of word recognition performance without depending on the analysis window width. Furthermore, Comparative Example 2 has the word recognition performance varying depending on the analysis window width but achieves higher word recognition performance than Comparative Example 1 at most of the analysis window widths (=56 to 152 ms). However, for example, at an analysis window width of 152 ms, the rate of performance improvement is only up to about 3.6%. On the other hand, the present embodiment achieves higher word recognition performance than Comparative Examples 1 and 2 at all the analysis window widths (=25 to 216 ms). Specifically, at an analysis window width of 56 ms, the rate of performance improvement is up to about 9.5%. As described above, the present evaluation experiments quantitatively indicate that the noise tolerance of speech recognition is improved by using the speech feature obtained by coupling the SATC to the conventional speech feature, for example, the MFCC.

In the present embodiment, the filter bank application units 104 and 210 may be omitted. In this case, the subband average time calculation unit 211 calculates the subband average time 21 on the basis of the power spectrum 12 and the multiplication spectrum 19. Specifically, the subband average time calculation unit 211 can utilize Expression (12).

$$\langle t \rangle_{(m)} = \frac{\sum_{\omega \in \Omega_m} \tau_g(\omega)|X(\omega)|^2}{\sum_{\omega \in \Omega_m} |X(\omega)|^2} \tag{12}$$

where $|X(\omega)|^2$ corresponds to the power spectrum 12, and $\tau_g(\omega)|X(\omega)|^2$ corresponds to the multiplication spectrum 19. That is, the subband average time calculation unit 211 obtains the subband average time 21 in the $m^{th}$ frequency band ($\Omega_m$) by dividing the summation of the multiplication spectrum 19 in the $m^{th}$ frequency band ($\Omega_m$) by the summation of the power spectrum 12 in the $m^{th}$ frequency band ($\Omega_m$).

(Third Embodiment)

Figure 7:
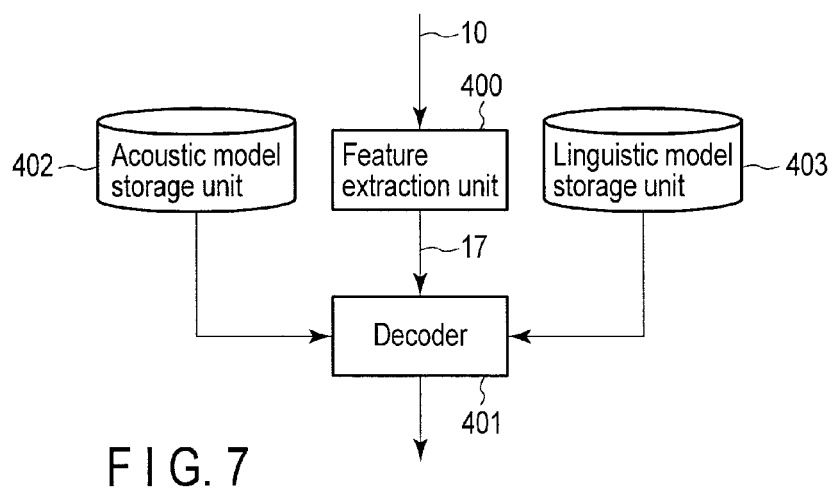
FIG. 7 is block diagram illustrating a speech recognition apparatus according to a third embodiment.

As illustrated in FIG. 7, a speech recognition apparatus according to a third embodiment comprises a feature extraction unit 400, a decoder 401, an acoustic model storage unit 402, and a linguistic model storage unit 403. The speech recognition apparatus in FIG. 7 performs a speech recognition process on an input speech signal 10 to output a linguistic text indicative of the content of the input speech signal 10, as a speech recognition result.

The feature extraction unit 400 may incorporate the speech feature extraction apparatus according to the first or second embodiment or a fourth or fifth embodiment described below. The feature extraction unit 400 acquires the input speech signal 10 from an outside of the speech recognition apparatus. The feature extraction unit 400 extracts at least a speech feature 17 containing at least an SATC from the input speech signal 10. The feature extraction unit 400 outputs the speech feature 17 to the decoder 401.

The decoder 401 inputs the speech feature 17 from the feature extraction unit 400. With reference to an acoustic model stored in the acoustic model storage unit 402 and a linguistic model stored in the linguistic model storage unit 403, the decoder 401 performs a speech recognition process using the speech feature 17. On the basis of acoustic similarity and linguistic reliability, the decoder 401 sequentially transforms the input speech signal 10 into words registered in a recognition dictionary stored in a recognition dictionary storage unit (not shown in the drawings) to generate a speech recognition result. Here, the acoustic similarity means the acoustic similarity between a speech to be recognized (that is, the speech feature 17) and an acoustic model of a word that is a recognition candidate. Furthermore, the linguistic reliability means the linguistic (grammatical and syntactic) reliability of a sequence including the word that is a recognition candidate. The linguistic reliability is evaluated on the basis of, for example, a linguistic model such as an n-gram model. The decoder 401 outputs the speech recognition result to an outside of the speech recognition apparatus. Here, the outside of the speech recognition apparatus may be a display apparatus configured to display texts, a printing apparatus configured to print texts, or a linguistic processing apparatus configured to perform any linguistic process such as translation of texts into another language.

The acoustic model storage unit 402 stores an acoustic model. The acoustic model is referenced by the decoder 401 as necessary. The linguistic model storage unit 403 stores a linguistic model. The linguistic model is referenced by the decoder 401 as necessary.

As described above, the speech recognition apparatus according to the third embodiment performs a speech recognition process on the basis of a speech feature containing at least an SATC. Thus, the speech recognition apparatus can achieve high recognition accuracy even in a noisy environment.

(Fourth Embodiment)

As illustrated in FIG. 8, a speech feature extraction apparatus according to a fourth embodiment comprises a speech segment extraction unit 101, a power spectrum calculation unit 102, a filter bank application unit 104, a subband average time calculation unit 513, and an axis transformation unit 107. The speech feature extraction apparatus in FIG. 8 extracts a speech feature 32 from an input speech signal 10.

The speech segment extraction unit 101 acquires the input speech signal 10 from an outside of the speech feature extraction apparatus. The speech segment extraction unit 101 extracts speech segments over a period $T_0$ (for example, $T_0$=25 ms) from the input speech signal 10 at intervals of a unit time to generate a unit speech signal 11 at a time (n) ($x_n$ (t)). That is, according to the present embodiment, the speech segment extraction unit 101 performs a speech segment extraction process that is the same as or similar to the speech segment extraction process according to the first embodiment or the second embodiment. The speech segment extraction unit 101 outputs the unit speech signal 11 to the power spectrum calculation unit 102.

According to the present embodiment, the period $T_0$ used by the speech segment extraction unit 101 may be set shorter than the period T (that is, an analysis window width) used by the speech segment extraction unit 101 according to the first embodiment or the second embodiment. For example, T may be set to 56 ms; and $T_0$ may be set to 25 ms.

The subband average time calculation unit 513 inputs a filtered power spectrum 14 from the filter bank application unit 104. On the basis of the filtered power spectrum 14, the subband average time calculation unit 513 calculates the average time of the unit speech signal 11 in each of at least one frequency band (the average time is hereinafter also referred to as the subband average time 31). The subband average time calculation unit 513 outputs the subband average time 31 to the axis transformation unit 107. The processing performed by the subband average time calculation unit 513 will be described in detail.

The axis transformation unit 107 inputs the subband average time 31 from the subband average time calculation unit 513. The axis transformation unit 107 performs an axis transformation process that is the same as or similar to the axis transformation process according to the first or second embodiment to generate a speech feature 32. The speech feature 32 corresponds to the above-described speech feature 17 or 22 and is also referred to as the SATC. The axis transformation unit 107 outputs the speech feature 32 to an outside of the speech feature extraction apparatus. The axis transformation unit 107 may be omitted. In this case, the subband average time 31 is output to the outside of the speech feature extraction apparatus as the speech feature 32. For example, if the total number of the frequency filters in the filter bank applied by the filter bank application unit 104 is 1, the axis transformation unit 107 is unnecessary.

Here, the subband average time 31 means a time required to reach the center of energy gravity of the unit speech signal 11 in each of the at least one frequency band. Hence, the subband average time calculation unit 513 can calculate the subband average time 31 in accordance with:

$$\langle t \rangle_{(m)} = \frac{\sum_{\tau=-T/2}^{T/2} \tau w(\tau) \sum_{\omega \in \Omega_m} h_m(\omega)|X(n+\tau, \omega)|^2}{\sum_{\tau=-T/2}^{T/2} w(\tau) \sum_{\omega \in \Omega_m} h_m(\omega)|X(n+\tau, \omega)|^2} \quad (13)$$

where $\tau$ denotes an offset from a time n, and $w(\tau)$ denotes a weight corresponding to $\tau$; $|X(n+\tau, \omega)|^2$ denotes a power spectrum 12 at a frequency $\omega$ and a time n+$\tau$; and $h_m(\omega)$ $(|X(n+\tau, \omega)|^2$ denotes a filtered power spectrum 14 at the frequency $\omega$ and the time n+$\tau$.

The weight $w(\tau)$ may be determined to be largest at $\tau$=0 and to decrease linearly or non-linearly with increasing absolute value of $\tau$. Alternatively, the weight $w(\tau)$ may be determined to have a constant value (for example, 1) regardless of the value of $\tau$. Alternatively, the weight $w(\tau)$ may be determined to be zero for several values of $\tau$.

T in Expression (13) is also referred to as the analysis window width. T is set to a value greater than or equal to the above-described unit time (the value is, for example, 56 ms). Expression (13) gives the subband average time 31 in the $m^{th}$ frequency band ($\Omega_m$).

That is, as illustrated in FIG. 10, the subband average time calculation unit 513 calculates the summation, in the $m^{th}$ frequency band ($\Omega_m$), of the filtered power spectrum 14 at a given time. The subband average time calculation unit 513 obtains the subband average time 31 in the $m^{th}$ frequency band ($\Omega_m$) by calculating, for the summation, the center of energy gravity within an interval from a time n−T/2 to a time n+T/2.

Figure 9:
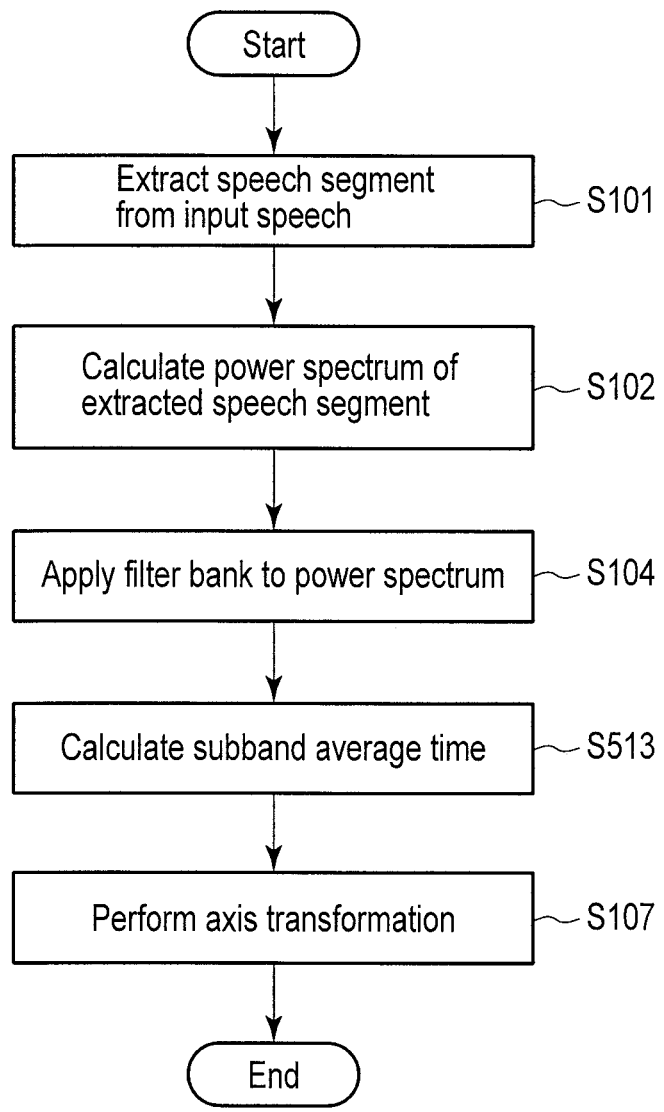
FIG. 9 is a flowchart illustrating operation of the speech feature extraction apparatus in FIG. 8.

The speech feature extraction apparatus in FIG. 8 can operate as illustrated in FIG. 9. The speech segment extraction unit 101 extracts speech segments over a period $T_0$ from the input speech signal 10 at intervals of a unit time to generate a unit speech signal 11 (step S101).

The subband average time calculation unit 513 calculates the subband average time 31 on the basis of the filtered power spectrum 14 obtained in step S104 (step S513). The axis transformation unit 107 performs an axis transformation process on the subband average time 31 calculated in step S513 to generate a speech feature 32 (step S107).

As described above, the subband average time 31 according to the present embodiment is different from the subband average time 16 calculated according to the first embodiment and the subband average time 21 according to the second embodiment in a calculation method. However, as described with reference to FIG. 11A, FIG. 11B, FIG. 12A, FIG. 12B, FIG. 15A, and FIG. 15B, the subband average time 31 expresses a speech feature that is the same as or similar to the subband average time 16 calculated according to the first embodiment.

A graph in FIG. 15A illustrates the subband average time 16, and a graph in FIG. 15B illustrates the subband average time 31. Two-dimensional graphs obtained from the three-dimensional graphs in FIG. 15A and FIG. 15B are shown in FIG. 11A, FIG. 11B, FIG. 12A, and FIG. 12B.

Figure 11A:
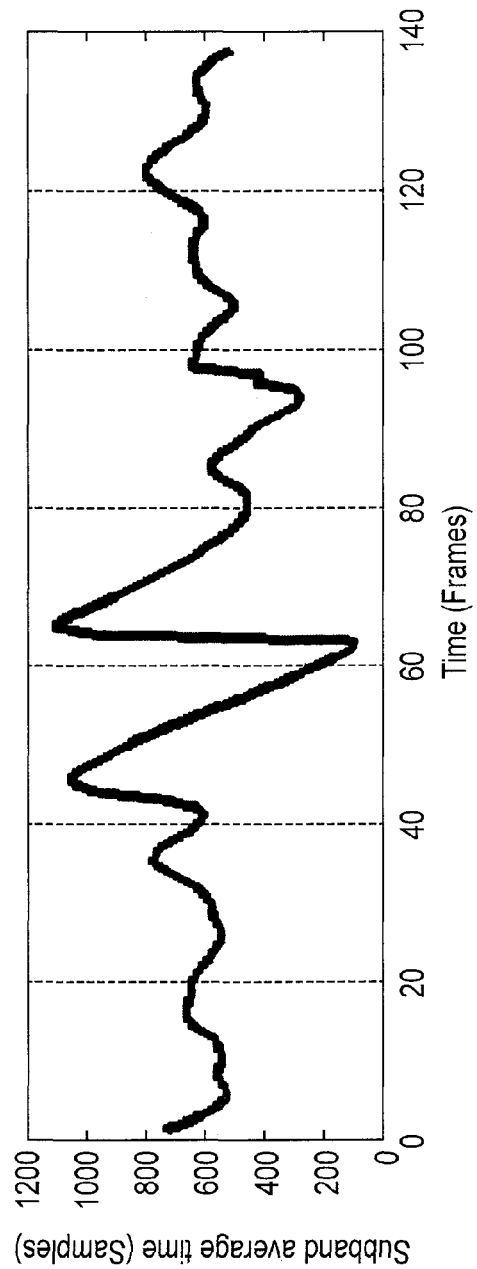
FIG. 11A is a diagram illustrating the subband average time calculated according to the first embodiment.
Figure 11B:
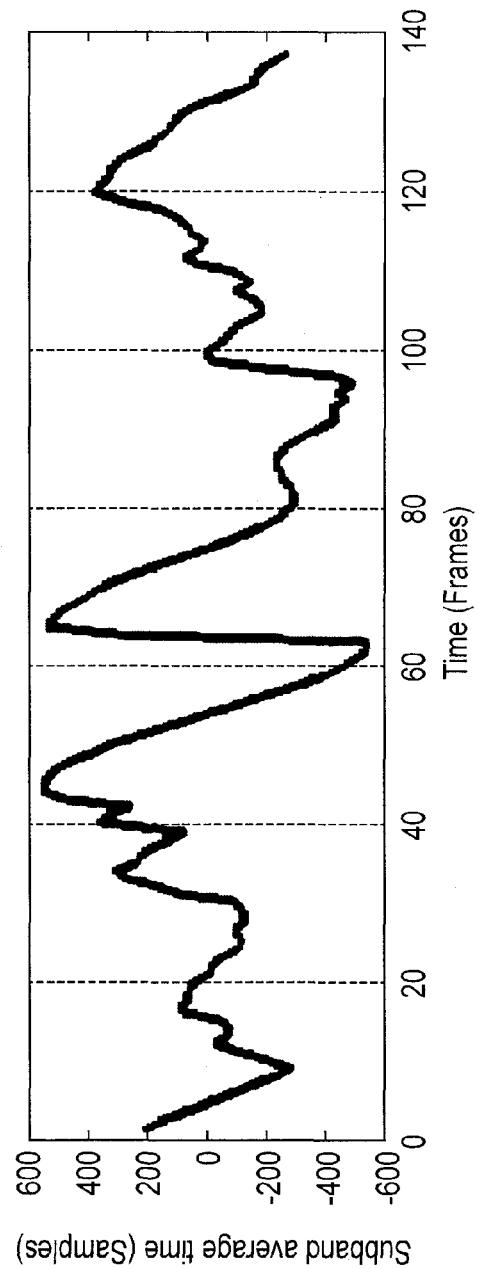
FIG. 11B is a diagram illustrating the subband average time calculated according to the fourth embodiment.

A graph in FIG. 11A shows the relationship between the time and the subband average time 16 at a first frequency of interest which is included in the graph in FIG. 15A. The first frequency of interest is selected from the low-frequency band in FIG. 15A. A graph in FIG. 11B shows the relationship between the time and the subband average time 31 at the first frequency of interest which is included in the graph in FIG. 15B. FIG. 11A and FIG. 11B show that the subband average times 16 and 31 have generally the same characteristics on the low-frequency band.

Figure 12A:
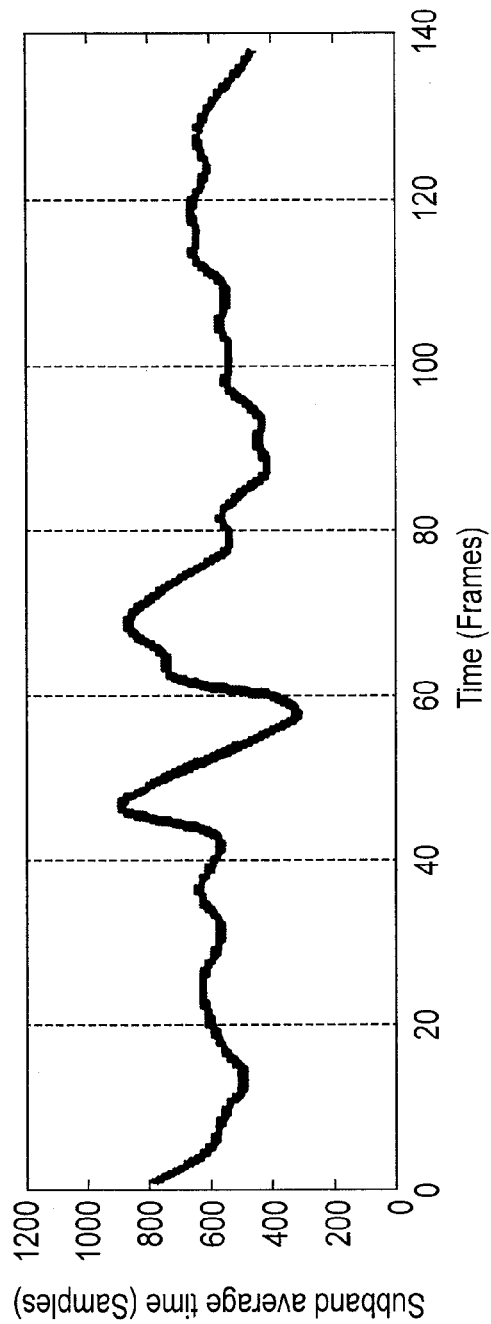
FIG. 12A is a diagram illustrating the subband average time calculated according to the first embodiment.
Figure 12B:
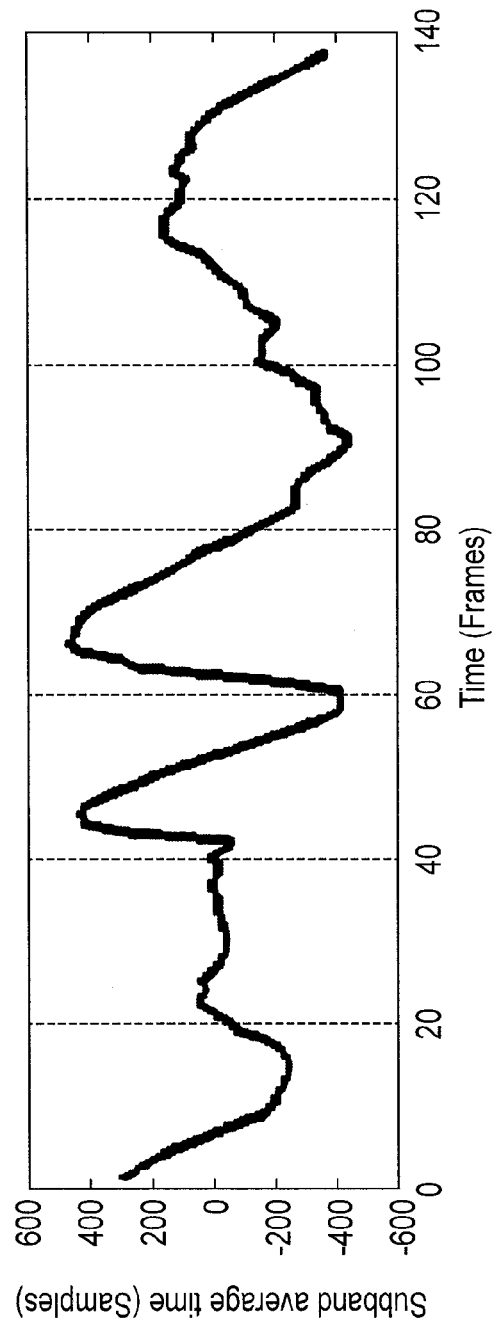
FIG. 12B is a diagram illustrating the subband average time calculated according to the fourth embodiment.

A graph in FIG. 12A shows the relationship between the time and the subband average time 16 at a second frequency of interest which is included in the graph in FIG. 15A. The second frequency of interest is selected from the high-frequency band in FIG. 15A. A graph in FIG. 12B shows the relationship between the time and the subband average time 31 at the second frequency of interest which is included in the graph in FIG. 15B. FIG. 12A and FIG. 12B show that the subband average times 16 and 31 also have generally the same characteristics on the high-frequency band.

As described above, the speech feature extraction apparatus according to the fourth embodiment extracts the SATC as a speech feature. Thus, the speech feature extraction apparatus can exert effects that are the same as or similar to the effects of the first or second embodiment.

In the present embodiment, the filter bank application unit 104 may be omitted. In this case, the subband average time calculation unit 513 calculates the subband average time 31 on the basis of the power spectrum 12. Specifically, the subband average time calculation unit 513 can utilize Expression (14).

$$\langle t \rangle_{(m)} = \frac{\sum_{\tau=-T/2}^{T/2} \tau w(\tau) \sum_{\omega \in \Omega_m} |X(n+\tau, \omega)|^2}{\sum_{\tau=-T/2}^{T/2} w(\tau) \sum_{\omega \in \Omega_m} |X(n+\tau, \omega)|^2} \quad (14)$$

That is, the subband average time calculation unit 513 calculates the summation, in the $m^{th}$ frequency band ($\Omega_m$), of the power spectrum 12 at a given time. The subband average time calculation unit 513 obtains the subband average time 31 in the $m^{th}$ frequency band ($\Omega_m$) by calculating, for the summation, the center of energy gravity within an interval from the time n−T/2 to the time n+T/2.

(Fifth Embodiment)

Figure 13:
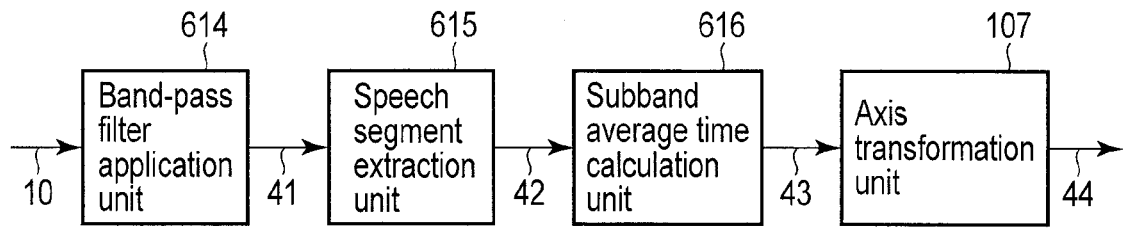
FIG. 13 is a block diagram illustrating a speech feature extraction apparatus according to a fifth embodiment.

As illustrated in FIG. 13, a speech feature extraction apparatus according to a fifth embodiment comprises a band-pass filter application unit 614, a speech segment extraction unit 615, a subband average time calculation unit 616, and an axis transformation unit 107. The speech feature extraction apparatus in FIG. 13 extracts a speech feature 44 from an input speech signal 10.

The band-pass filter application unit 614 acquires the input speech signal 10 from an outside of the speech feature extraction apparatus. The band-pass filter application unit 614 applies at least one band-pass filter to the input speech signal 10. That is, the band-pass filter application unit 614 extracts signal components of at least one (for example, 16) frequency bands from the input speech signal 10 to obtain at least one subband input speech signal 41. The band-pass filter application unit 614 outputs at least one subband input speech signal 41 to the speech segment extraction unit 615. If the number of band-pass filters is 1, the band-pass filter application unit 614 may be omitted. In such a case, a value is obtained which is the same as or similar to the value obtained if the total number of frequency filters in the filter bank applied by the filter bank application unit 104 according to the fourth embodiment is 1.

The speech segment extraction unit 615 inputs at least one subband input speech signal 41 from the band-pass filter application unit 614. The speech segment extraction unit 615 extracts speech segments over a period T (for example, T=56 ms) from the at least one subband input speech signal 41 at intervals of a unit time to generate at least one subband unit speech signal 42. More specifically, the speech segment extraction unit 615 extracts the speech segments over the period T from the $m^{th}$ subband input speech signal 41 at intervals of the unit time to generate the $m^{th}$ subband unit speech signal 42 at a time (n) ($x_{nm}(T)$). The speech segment extraction unit 615 outputs the at least one subband unit speech signal 42 to the subband average time calculation unit 616.

The speech segment extraction unit 615 may generate at least one subband unit speech signal 42 by performing, in addition to the process of extracting speech segments over the period T at intervals of a unit time, a process of removing a direct current component from the extracted speech segments, a process of emphasizing a high-frequency component of the extracted speech segments, a process of multiplying the extracted speech segments by a window function (for example, a Hamming window), and the like.

The subband average time calculation unit 616 inputs the at least one subband unit speech signal 42 from the speech segment extraction unit 615. The subband average time calculation unit 616 calculates the average time of each subband unit speech signal 42 (the average time is hereinafter also referred to as the subband average time 43). The subband average time calculation unit 616 outputs the subband average time 43 to the axis transformation unit 107. The processing performed by the subband average time calculation unit 616 will be described in detail.

The axis transformation unit 107 inputs the subband average time 43 from the subband average time calculation unit 616. The axis transformation unit 107 subjects the subband average time 43 to an axis transformation process that is the same as or similar to the axis transformation process according to the first, second, or fourth embodiment to generate a speech feature 44. The speech feature 44 corresponds to the above-described speech feature 17, 22, or 32 and is also referred to as the SATC. The axis transformation unit 107 outputs the speech feature 44 to an outside of the speech feature extraction apparatus. The axis transformation unit 107 may be omitted. In this case, the subband average time 43 is output to the outside of the speech feature extraction apparatus as the speech feature 44. For example, if the total number of the band-pass filters applied by the band-pass filter application unit 614 is 1, or if the band-pass filter application unit 614 is omitted, the axis transformation unit 107 is unnecessary.

Here, the subband average time 43 is the average time of each of the at least one subband unit speech signal 42.

Hence, the subband average time calculation unit 616 can calculate the subband average time 43 in accordance with Expression (15).

$$\langle t \rangle_{(m)} = \frac{\sum_{\tau=-T/2}^{T/2} \tau w(\tau) |x_{nm}(\tau)|^2}{\sum_{\tau=-T/2}^{T/2} w(\tau) |x_{nm}(\tau)|^2} \quad (15)$$

where $x_{nm}(t)$ denotes the $m^{th}$ subband unit speech signal 42 at the time n. T in Expression (15) is also referred to as the analysis window width. Expression (15) gives the subband average time 43 in the $m^{th}$ frequency band ($\Omega_m$).

That is, the subband average time calculation unit 616 obtains the subband average time 43 in the $m^{th}$ frequency band ($\Omega_m$) by calculating the center of energy gravity of the power ($|x_m(n+\tau)|^2$) of the $m^{th}$ subband unit speech signal 42 within an interval from a time n−T/2 to a time n+T/2.

Expression (15) assumes that time τ=0 is set at the center of the subband unit speech signal 42. However, time τ=0 need not necessarily be set at the center of the subband unit speech signal 42. The ranges of the summations of the denominator and numerator on the right side to be determined may be changed as appropriate depending on the position of τ=0.

Figure 14:
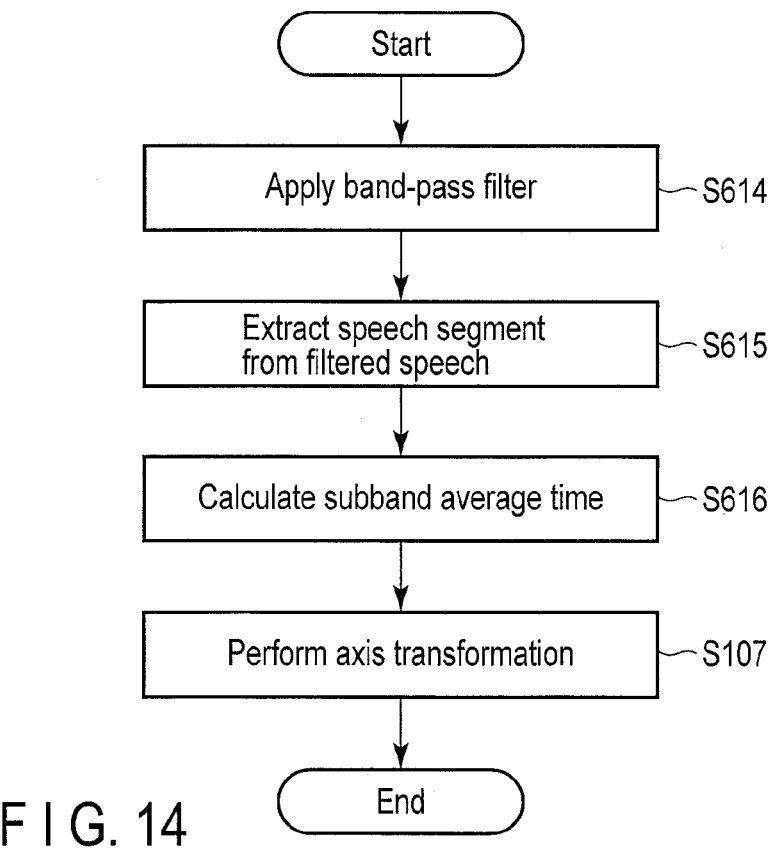
FIG. 14 is a flowchart illustrating operation of the speech feature extraction apparatus in FIG. 13.

The speech feature extraction apparatus in FIG. 13 can operate as illustrated in FIG. 14. The band-pass filter application unit 614 obtains at least one subband input speech signal 41 by applying at least one band-pass filters to the input speech signal 10 acquired from the outside of the speech feature extraction apparatus (step S614).

The speech segment extraction unit 615 extracts speech segments over the period T, at intervals of a unit time, from the at least one subband input speech signal 41 obtained in step S614 to generate at least one subband unit speech signal 42 (step S615).

The subband average time calculation unit 616 calculates the average time of each of the at least one subband unit speech signal 42 generated in step S615 to obtain a subband average time 43 (step S616). The axis transformation unit 107 performs an axis transformation process on the subband average time 43 calculated in step S616 to generate a speech feature 44 (step S107).

As described above, the speech feature extraction apparatus according to the fifth embodiment extracts the SATC as a speech feature. Thus, the speech feature extraction apparatus can exert effects that are the same as or similar to the effects of the first, second, or fourth embodiment.

The processing in the above-described embodiments can be implemented using a general-purpose computer as basic hardware. A program implementing the processing in each of the above-described embodiments may be stored in a computer readable storage medium for provision. The program is stored in the storage medium as a file in an installable or executable format. The storage medium is a magnetic disk, an optical disc (CD-ROM, CD-R, DVD, or the like), a magnetooptic disc (MO or the like), a semiconductor memory, or the like. That is, the storage medium may be in any format provided that a program can be stored in the storage medium and that a computer can read the program from the storage medium. Furthermore, the program implementing the processing in each of the above-described embodiments may be stored on a computer (server) connected to a network such as the Internet so as to be downloaded into a computer (client) via the network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A speech feature extraction apparatus, comprising:
a computer programmed to comprise:
an extraction unit configured to extract speech segments over a predetermined period at intervals of a unit time from an input speech signal to generate a unit speech signal;
a first calculation unit configured to calculate each subband average time corresponding to time required to reach a center of energy gravity of the unit speech signal in each of a plurality of frequency bands obtained by dividing an overall frequency band into a number smaller than a bin number of frequency;
a generation unit configured to generate a speech feature in each of the frequency bands based on the subband average time; and
a decoder performing speech recognition processing to transform the input speech signal into words using the speech feature in the each of the frequency bands, wherein the speech feature is expressed in terms of time.

2. The apparatus according to claim 1, wherein the computer is further programmed to comprise:
a second calculation unit configured to calculate a power spectrum of the unit speech signal, and
wherein the extraction unit extracts speech segments over the predetermined period from the input speech signal at intervals of the unit time to generate the unit speech signal, and
wherein the first calculation unit calculates the subband average time based on the power spectrum.

3. The apparatus according to claim 2, wherein the computer is further programmed to comprise:
a third calculation unit configured to calculate a first product of a real part of a first spectrum of the unit speech signal and a real part of a second spectrum of a product of the unit speech signal and a time, to calculate a second product of an imaginary part of the first spectrum and an imaginary part of the second spectrum, and to add the first product and the second product together to obtain a third spectrum; and
wherein the first calculation unit calculates the subband average time based on the power spectrum and the third spectrum.

4. The apparatus according to claim 3, wherein the computer is further programmed to comprise:
a first application unit configured to apply a first filter bank to the power spectrum to obtain a filtered power spectrum; and
a second application unit configured to apply a second filter bank to the third spectrum to obtain a filtered third spectrum, and wherein the first calculation unit calculates the subband average time based on the filtered power spectrum and the filtered third spectrum.

5. The apparatus according to claim 3, wherein the first calculation unit calculates the subband average time in a given frequency band of the frequency bands by dividing a summation of the third spectrum in the given frequency band by a summation of the power spectrum in the given frequency band.

6. The apparatus according to claim 2, wherein the computer is further programmed to comprise:
a third calculation unit configured to calculate a group delay spectrum of the unit speech signal; and
a multiplication unit configured to multiply the power spectrum by the group delay spectrum to obtain a multiplication spectrum, and
wherein the first calculation unit calculates the subband average time based on the power spectrum and the multiplication spectrum.

7. The apparatus according to claim 6, wherein the computer is further programmed to comprise:
a first application unit configured to apply a first filter bank to the power spectrum to obtain a filtered power spectrum; and
a second application unit configured to apply a second filter bank to the multiplication spectrum to obtain a filtered multiplication spectrum, and
wherein the first calculation unit calculates the subband average time based on the filtered power spectrum and the filtered multiplication spectrum.

8. The apparatus according to claim 2, wherein the computer is further programmed to comprise:
an application unit configured to apply a filter bank to the power spectrum to obtain a filtered power spectrum, and
wherein the first calculation unit calculates the subband average time based on the filtered power spectrum.

9. The apparatus according to claim 1, wherein the generation unit generates the speech feature by applying an axis transformation process on the subband average time.

10. A non-transitory computer readable storage medium storing instructions of a computer program which when executed by a computer results in performance of steps comprising:
extracting speech segments over a predetermined period at intervals of a unit time from an input speech signal to generate a unit speech signal;
calculating each subband average time corresponding to time required to reach a center of energy gravity of the unit speech signal in each of a plurality of frequency bands obtained by dividing an overall frequency band into a number smaller than a bin number of frequency;
generating a speech feature in each of the frequency bands based on the subband average time; and
transforming, by a decoder that performs speech recognition processing, the input speech signal into words using the speech feature in the each of the frequency bands, wherein the speech feature is expressed in terms of time.

11. A speech feature extraction method, comprising:
controlling a computer to:
extract speech segments over a predetermined period at intervals of a unit time from an input speech signal to generate a unit speech signal;
calculate each subband average time corresponding to time required to reach a center of energy gravity of the unit speech signal in each of a plurality of frequency bands obtained by dividing an overall frequency band into a number smaller than a bin number of frequency;
generate a speech feature in each of the frequency bands based on the subband average time; and
transform, by a decoder that performs speech recognition processing, the input speech signal into words using the speech feature in the each of the frequency bands, wherein the speech feature is expressed in terms of time.

12. A speech feature extraction method, comprising:
controlling a computer to:
extract speech segments over a predetermined period at intervals of a unit time from the plurality of subband input speech signals obtained by extracting signal components of a plurality of frequency bands from the input speech signal to generate a plurality of subband unit speech signals;
calculate each subband average time corresponding to a center of energy gravity of power of each of the plurality of subband unit speech signals within a predetermined interval;
generate a speech feature in each of the frequency bands based on the subband average time; and
transform, by a decoder that performs speech recognition processing, the input speech signal into words using the speech feature in the each of the frequency bands, wherein the speech feature is expressed in terms of time.

13. A non-transitory computer readable storage medium storing instructions of a computer program which when executed by a computer results in performance of steps comprising:
extracting speech segments over a predetermined period at intervals of a unit time from a plurality of subband input speech signals obtained by extracting signal components of a plurality of frequency bands from an input speech signal to generate a plurality of subband unit speech signals, wherein the plurality of subband input speech signals is obtained from the input speech signal by a band-pass filter;
calculating each subband average time corresponding to a center of energy gravity of power of each of the plurality of subband unit speech signals within a predetermined interval;
generating a speech feature in each of the frequency bands based on the subband average time; and
transforming, by a decoder that performs speech recognition processing, the input speech signal into words using the speech feature in the each of the frequency bands, wherein the speech feature is expressed in terms of time.

14. A speech feature extraction apparatus, comprising:
a computer programmed to comprise:
an extraction unit configured to extract speech segments over a predetermined period at intervals of a unit time from the plurality of subband input speech signals obtained by extracting signal components of a plurality of frequency bands from the input speech signal to generate a plurality of subband unit speech signals;
a calculation unit configured to calculate each subband average time corresponding to a center of energy gravity of power of each of the plurality of subband unit speech signals within a predetermined interval;
a generation unit configured to generate a speech feature in each of the frequency bands based on the subband average time; and a decoder performing speech recognition processing to transform the input speech signal into words using the speech feature in the each of the frequency bands, wherein the speech feature is expressed in terms of time.

15. The apparatus according to claim 14, wherein the generation unit generates the speech feature by applying an axis transformation process on the subband average time.

16. The apparatus according to claim 14, wherein the computer is further programmed to comprise:
   an application unit configured to apply a plurality of band-pass filters to the input speech signal to obtain the plurality of subband input speech signals, and
   wherein the extraction unit extracts speech segments over the predetermined period from the plurality of subband input speech signals at intervals of the unit time to generate the plurality of subband unit speech signals, and
   wherein the calculation unit calculates the subband average time.

* * * * *